United States Patent
Tame

Patent Number: 5,123,673
Date of Patent: Jun. 23, 1992

[54] SEAT BELT SYSTEM FOR A VEHICLE SEAT

[75] Inventor: Omar D. Tame, West Bloomfield, Mich.

[73] Assignee: Hoover Universal, Inc., Plymouth, Mich.

[21] Appl. No.: 662,473

[22] Filed: Feb. 28, 1991

[51] Int. Cl.⁵ .............................................. B60R 21/00
[52] U.S. Cl. .................................... 280/801; 180/268; 280/808; 297/468; 297/484
[58] Field of Search ............... 180/268; 280/801, 806, 280/807, 808; 297/468, 483, 484, 486

[56] References Cited

U.S. PATENT DOCUMENTS

| | | | |
|---|---|---|---|
| 4,260,178 | 4/1981 | Kluting | 280/806 |
| 4,451,087 | 5/1984 | Tamamushi | 297/468 |
| 4,553,625 | 11/1985 | Tsuge et al. | 180/268 |
| 4,569,536 | 2/1986 | Tsuge et al. | 280/807 |
| 4,673,195 | 6/1987 | Boyd et al. | 280/801 |

*Primary Examiner*—Kenneth R. Rice
*Attorney, Agent, or Firm*—Harness, Dickey & Pierce

[57] ABSTRACT

A seat belt system is disclosed for use with a vehicle seat which includes a three point belt system forming a lap belt and a shoulder belt and further includes a second shoulder belt to form a four point system. The belt system includes a presenter mechanism to move the clasp for the three point portion of the system into an easy to reach position to encourage seat belt usage. The system includes two buckles on opposite sides of the seat with a release mechanism provided to automatically release one buckle upon the manual release of the other buckle regardless of which buckle is first manually released.

12 Claims, 4 Drawing Sheets

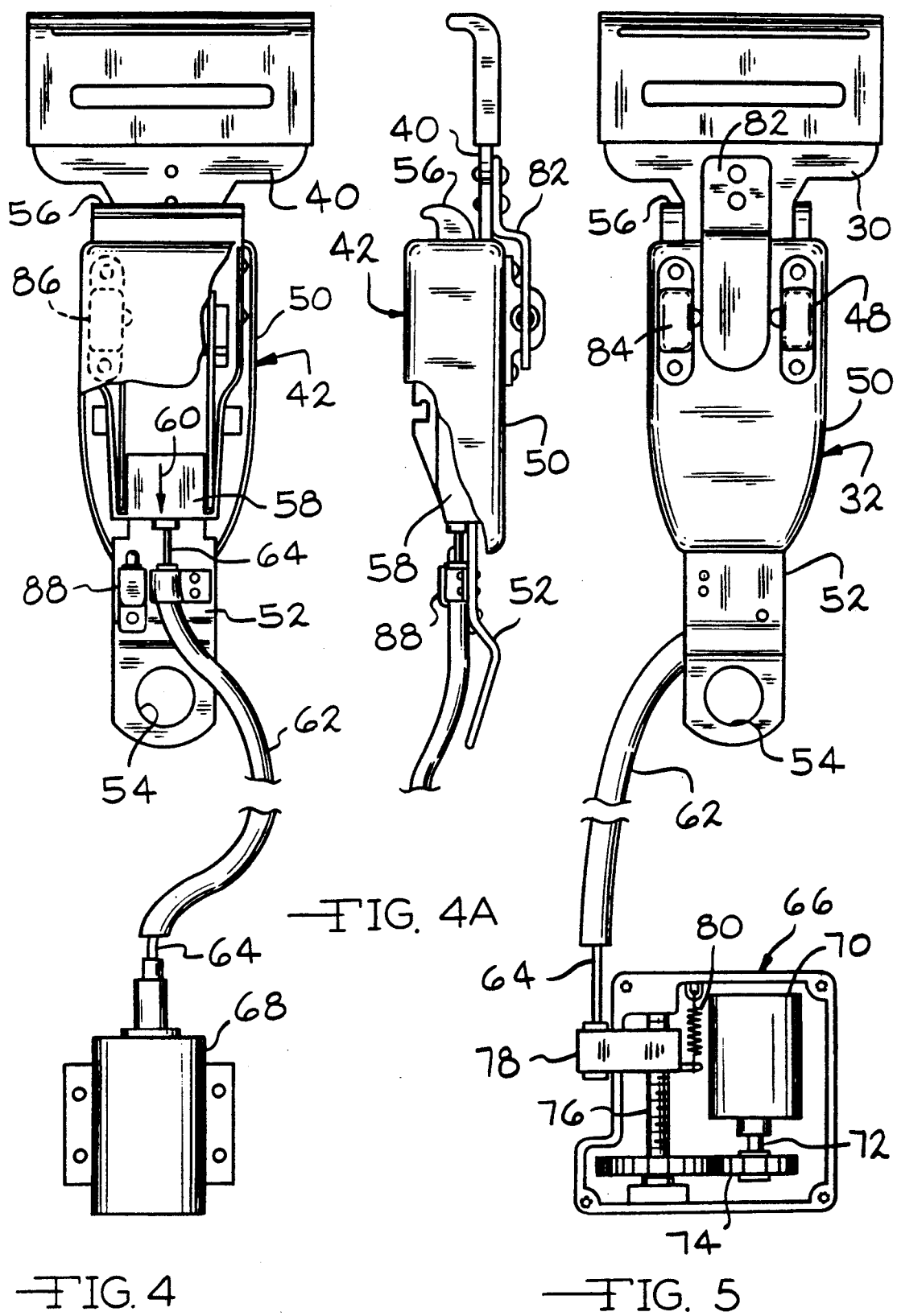

SEAT BELT SYSTEM FOR A VEHICLE SEAT

BACKGROUND AND SUMMARY OF THE INVENTION

The present invention relates to a seat belt system for a vehicle seat and in particular to a system which provides a movable seat belt mechanism to present the belt system clasp in a convenient position for a seat occupant to reach the clasp to buckle the seat belt. In addition, the belt system includes a four point restraint system having a second shoulder strap with a second clasp insertable into a second buckle. An automatic release mechanism is provided which, upon the manual release of one buckle, automatically releases the other buckle.

An important factor in encouraging seat belt use by vehicle occupants is to provide a seat belt system that is convenient for the seat occupant to use. Seat belt systems are commonly attached directly to the motor vehicle body rather than being attached to the vehicle seat. Since the vehicle seat position is adjustable within the vehicle body, the position of the occupant does not remain constant relative to the seat belt system. This can result in a difficult reach behind the seat to find the seat belt clasp in order to insert the clasp into the associated buckle forming the belts to restrain oneself in the seat.

Accordingly, it is an object of the present invention to provide a seat belt system having a presenter mechanism to move the clasp into an easy to reach location once an occupant has been seated in the vehicle seat.

It is a feature of the present invention to install the seat belt system directly on the vehicle seat so that regardless of the seat position within the vehicle, the seat belt system will remain in a constant position relative to the seat occupant.

The seat belt system includes a four point restraint system which is formed by a conventional three point belt mechanism comprising a lap belt and a shoulder belt crossing over the outboard shoulder of the seat occupant of the seat occupant to a buckle along the inboard side of the seat. The fourth point is added to the system forming a second shoulder belt extending across the inboard shoulder to a buckle along the outboard side of the seat. To facilitate release of the two buckles, an automatic release mechanism is provided which, upon the manual release of one buckle, automatically releases the other buckle. The release system is operable to release the buckles regardless of which buckle is first manually released.

The three point portion of the system includes a belt retractor mounted along the outboard side of the seat with the belt webbing extending downwardly along the front of the seat back to an anchor positioned at the rear end of the seat cushion along the outboard side. A clasp is slidably carried on the belt webbing between the anchor and the upper end of the seat back. A buckle is mounted to the inboard side of the seat near the rear of the seat cushion. When an occupant is seated in the seat, the presenter mechanism moves the anchor from the rear of the seat cushion toward the front of the seat cushion moving the belt and clasp forward from the seat back to a position easier for the occupant to reach the clasp and insert it into the buckle on the opposite seat side. Once the clasp is inserted in the buckle, the presenter mechanism returns the anchor to the rear position where it is locked in place.

The fourth point of the system is provided by a second retractor positioned along the inboard side of the seat assembly with the belt webbing extending from the seat back at the upper inboard side and terminating in a clasp. The clasp is inserted into a buckle mounted to the outboard side of the seat cushion next to the seat belt anchor when in the lock position.

Further objects, features and advantages of the invention will become apparent from a consideration of the following description and the appended claims when taken in connection with the accompanying drawings.

BRIEF DESCRIPTION OF THE DRAWINGS

FIG. 4 is a fragmentary front view of the fourth point buckle;

FIG. 4A is a side fragmentary view of the buckle shown in FIG. 4;

FIG. 5 is a rear view of the three point buckle and automatic release mechanism;

DETAILED DESCRIPTION OF THE INVENTION

Figure 1:
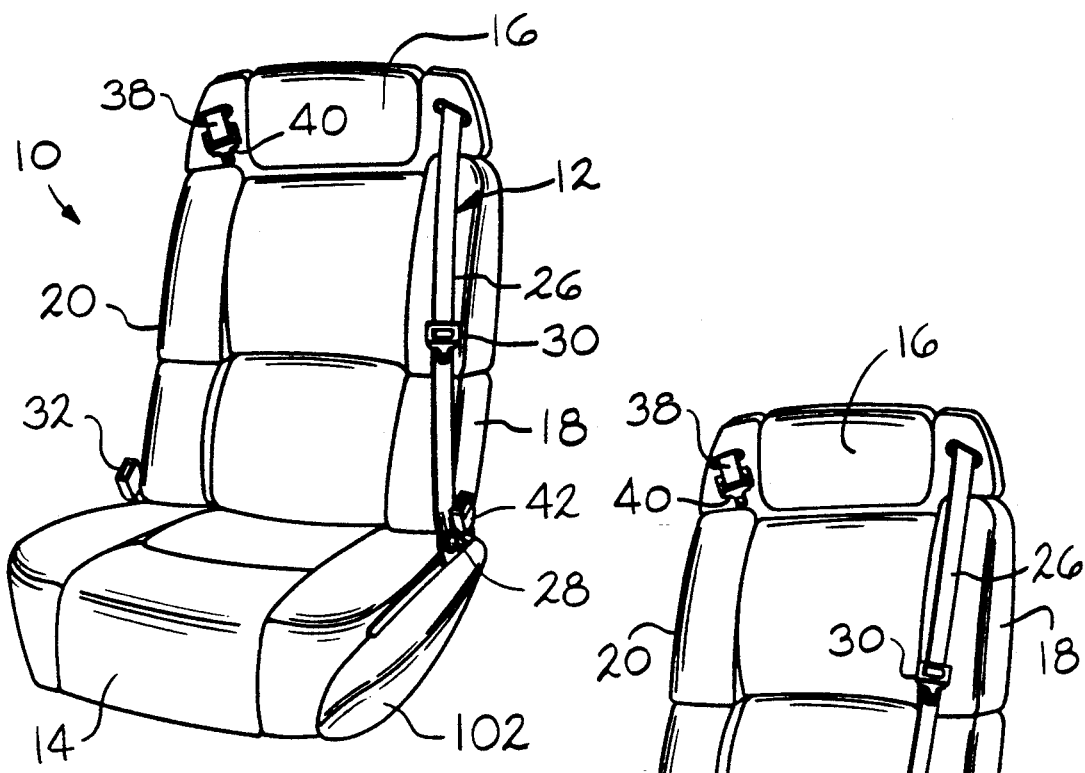
FIG. 1 is a perspective view of a vehicle seat containing the seat belt system of the present invention showing the belt system with the seat unoccupied.

Seat 10 shown in FIG. 1 includes a seat belt system 12 of the present invention. Seat 10 has a seat cushion 14 and seat back 16 extending upwardly at the rear of the cushion 14. Side 18 of the seat is designated as the outboard side while side 20 is designated as the inboard side. The designations "inboard" and "outboard" are only used as a convenience in describing the seat belt system and are not intended to serve as limitations.

Figure 3:
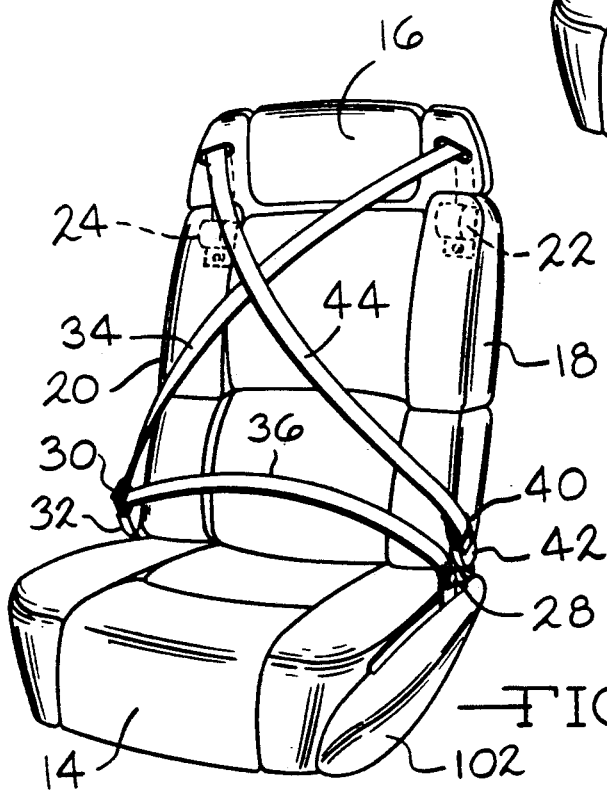
FIG. 3 is a perspective view of the seat showing the belt system in the fastened position.

The seat belt system 12 includes a pair of retractors 22 and 24 disposed in opposite sides of the seat back. The retractors are only shown in FIG. 3 for purposes of clarity. A belt webbing 26 extends from retractor 22 and projects from the upper end of the outboard side of the seat back and extends downward along the outboard side of the seat to a seat belt anchor 28 coupled to the seat cushion. A belt clasp 30 is slidably carried by the belt webbing 26 between anchor 28 and the upper end of the seat back. A seat belt buckle 32 is fastened to the inboard side of the seat near the rear of the seat cushion. Retractor 22, webbing 26, anchor 28, clasp 30 and buckle 32 form the three point restraint portion of the seat belt system 12. When the clasp 30 is inserted into buckle 32 as shown in FIG. 3, the webbing 26 forms a shoulder belt 34 and a lap belt 36 to restrain the seat occupant in the seat 10.

The fourth point portion of the belt system includes the retractor 24 and the belt webbing 38 extending therefrom and the clasp 40 disposed at the upper end of the inboard side of the seat back. A buckle 42 is attached to the rear of the cushion 14 along the outboard side for reception of the clasp 40 therein. When the clasp 40 is inserted into buckle 42, the webbing 38 forms a second shoulder belt 44 extending from the upper inboard side of the seat to the lower outboard side. The buckle 32 will be referred to as the three point buckle while buckle 42 will be referred to as the fourth point buckle.

Figure 2:
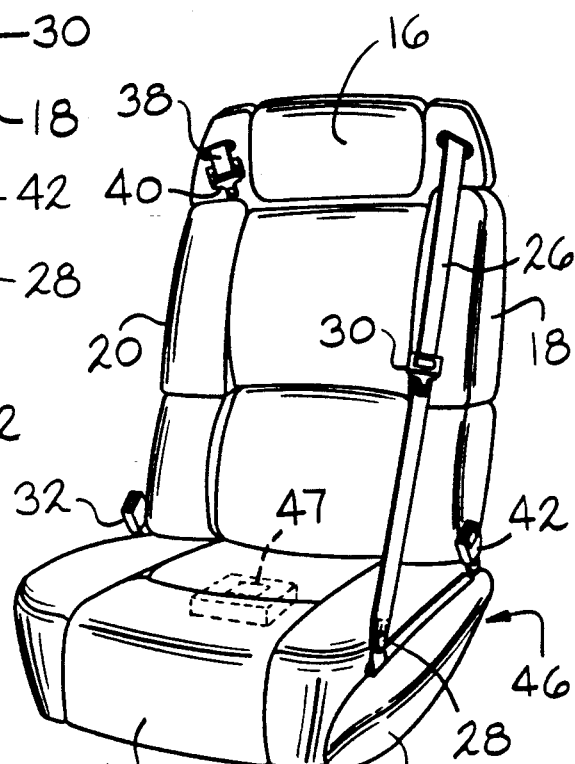
FIG. 2 is a perspective view of the seat assembly of FIG. 1 showing the seat belt system in a presented position.
Figure 7:
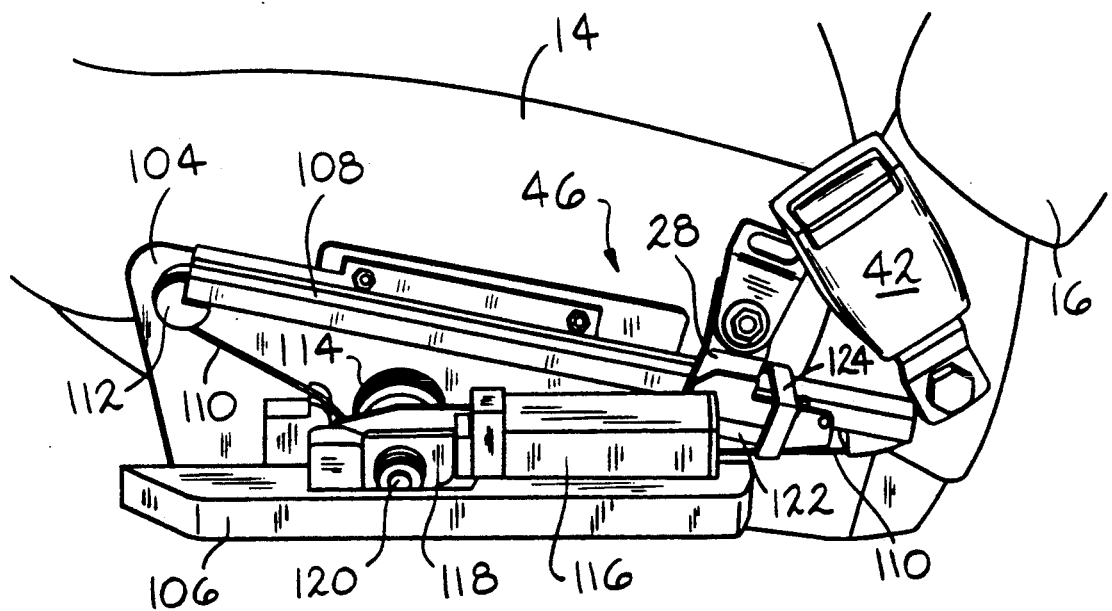
FIG. 7 is a side perspective view showing one embodiment of the presenter mechanism.
Figure 8:
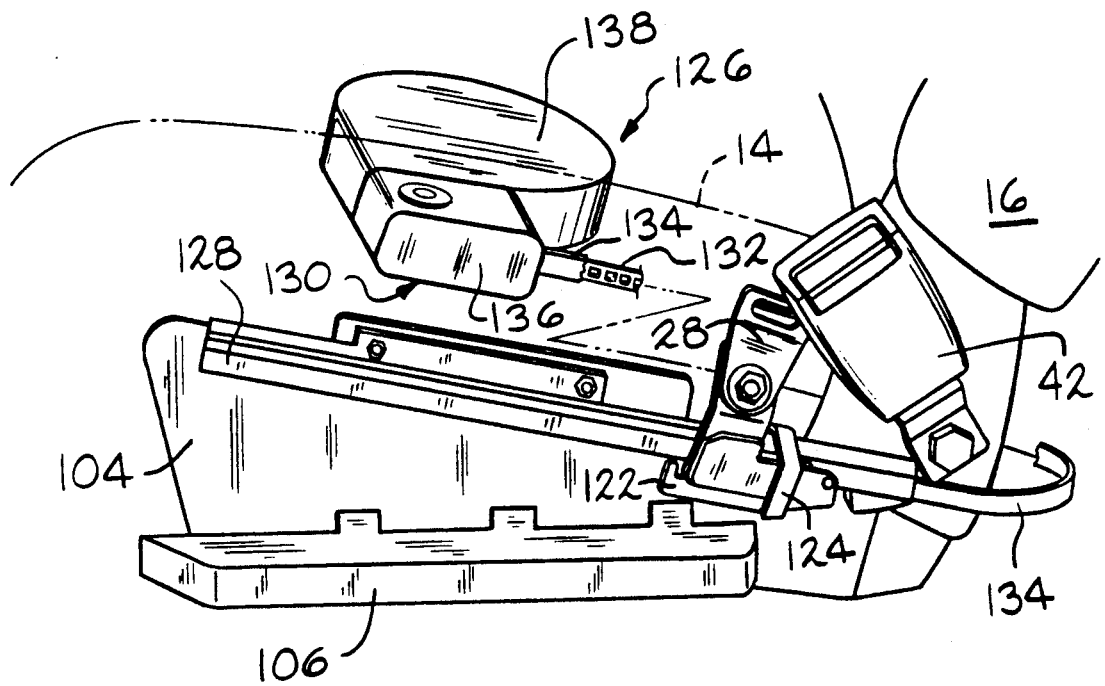
FIG. 8 is a side perspective view of the seat showing a second embodiment of the presenter mechanism.

A presenter mechanism 46, shown in greater detail in FIGS. 7 and 8, is provided along the outboard side of the seat assembly. The presenter mechanism moves the anchor 28 forward from the rear of the seat cushion to a forward position shown in FIG. 2 in response to a person occupying the seat 10. As a result, the webbing 26 is moved forward from the seat back moving the clasp 30 into an easy to reach position. Presenter mechanism 46 can be actuated in several ways. One way is a switch 47 in the seat cushion 14 to sense the occupant's weight. Another way can be a combination of the seat switch plus the vehicle door closing to indicate a seat occupant. A switch 48 (shown in FIG. 5) on the buckle 32 detects the presence of the clasp in the buckle and signals the presenter mechanism to return the anchor 28 to the rear lock position shown in FIG. 3. The control circuit also includes a timer which, after a predetermined delay, such as 10-15 seconds, automatically returns the anchor 28 to the lock position if the seat occupant does not first insert the clasp 30 into buckle 32.

The belt system has been shown in the figures attached to the vehicle seat. This is advantageous in that the belt system remains in a fixed position relative to the seat occupant regardless of the adjusted position of the seat. However, the convenience of the presenter mechanism can be achieved with the belt system mounted to the vehicle. The presenter can still be used to move a floor mounted anchor forward to present the belt clasp.

FIGS. 4, 4A and 5 show the buckles in greater detail. Buckles 32 and 42 each include a housing 50 carried by a mounting strap 52 having an aperture 54 for securing the mounting strap and buckle to the seat 10. The housing 50 includes an opening in its upper end for insertion of the clasps therein and each contain an internal mechanism for locking with the clasps to prevent removal as is conventional with a seat belt buckle. A manual release button 56 is provided with each buckle which, upon depression, actuates the internal mechanism of the buckle to release the clasp. In so doing the yoke 58 shown in FIG. 4 is moved downwardly in the direction of arrow 60.

An automatic release system is provided to automatically release one buckle upon manual release of the other buckle. This is accomplished by bowden cables 62 having wires 64 coupled to yokes 58 of the buckles. The opposite end of the wires 64 are coupled linear actuators shown as to either a motorized actuator 66 (FIG. 5) or a solenoid 68 (FIG. 4).

The motorized actuator 66 includes a small electric motor 70 having an output shaft 72 operable to rotate a gear set 74 coupled to a lead screw 76. A drive nut 78, coupled to wire 64 is linearly movable along the lead screw in response to screw rotation. Upon actuation, the motor 70 will rotate the screw 76 to move the drive nut 78 in a direction to pull on wire 64 resulting in motion of the yoke 58 in the direction to release the clasp. Upon deactivation of the motor 70, a return spring 80 connected to the drive nut will return the drive nut 78 to its nominal position. The threads of the lead screw 76 are of an appropriate pitch for the drive nut to back drive motor 70.

Alternatively, a solenoid 68 can be coupled to the end of wire 64 to provide the necessary pull on the wire to release the buckle. Once deactivated a spring return in the solenoid will return the wire to its nominal position.

The clasps 30 and 40 each have a tab 82 mounted on one side that extends along the outer side of the housings 50 when the clasps are inserted into the buckles. The buckle 32 includes two switches, switch 48 and switch 84 on the outside of the housing which are actuated by the tab 82 when the clasp is inserted into the buckle.

The buckle 42 contains one switch 86 on the back side of the housing for engagement with the tab 82 and a second switch 88 carried by the mounting strap 52 for engagement with the yoke 58 when the yoke is moved downward during manual release. Switch 48, as previously mentioned, detects the insertion of clasp 30 into buckle 32 to signal the presenter mechanism 46 to return the anchor 28 to the lock position.

The other three switches 84, 86 and 88 are operable to actuate the automatic release mechanism and also to prevent the clasp 40 from being inserted into buckle 42 forming the fourth point of the restraint system without first inserting clasp 30 into buckle 32 forming the three point system comprising the lap 36 and shoulder belt 34. It is necessary that a person be restrained with a lap belt in addition to a shoulder belt. Accordingly, the seat belt system is designed to prevent a seat occupant from merely using the shoulder belt 44 without the lap belt 36. This is accomplished by preventing engagement of clasp 40 in buckle 42 without first having inserted clasp 30 into buckle 32 forming the lap belt 36.

Figure 6:
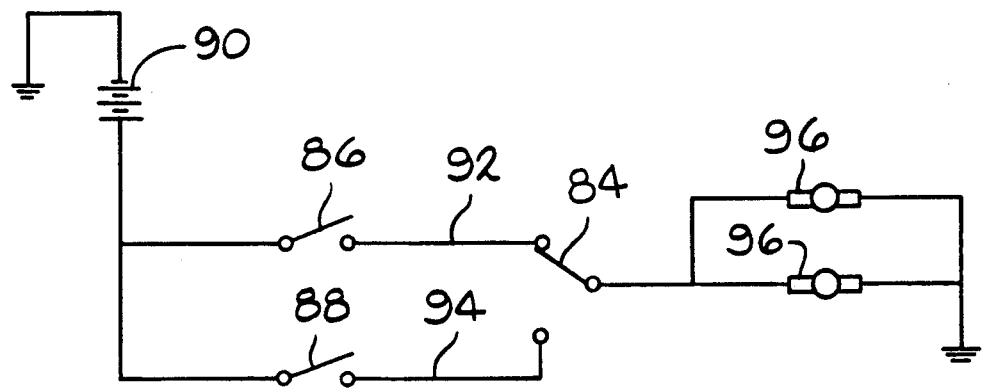
FIG. 6 is a circuit diagram showing the electrical circuit of the release system.

A circuit diagram for the seat belt system is shown in FIG. 6. The circuit is use to selectively connect the vehicle power source 90 to the linear actuators used to release the buckles. The circuit includes two leads 92 and 94 parallel with one another and each including a normally open switch 86 or 88 respectively. A single pole double throw switch 84 selectively connects either lead 92 or lead 94 to the linear actuators 96. The belt system control function can also be easily accomplished using a microprocessor.

The switches 86 and 88 are normally open while switch 84 is normally closed to lead wire 92 and open to lead wire 94. In the event that a seat occupant attempts to engage clasp 40 into buckle 42 forming the shoulder strap 44 without first inserting clasp 30 into buckle 32 to form the lap belt, the switch 86 on buckle 42 will close. This activates the linear actuators 96, automatically releasing the buckle 42, thereby preventing the shoulder strap 44 from being formed.

However, upon first inserting clasp 30 into buckle 32, the switch 84 will be activated to close with lead wire 94 and open with lead wire 92. Upon subsequent insertion of clasp 40 into buckle 42, closing switch 86, the circuit will not be closed and the linear actuators will not be activated. Upon manual release of buckle 42, as the yoke 58 travels downward the switch 88 will now close and close the circuit activating the linear actuators 96 through lead 94 releasing the buckle 32. Alternatively, if the buckle 32 is manually released first, the switch 84 will return to its normal position in contact with lead wire 92 now completing the circuit through lead wire 92 and releasing the buckle 42. Thus, upon the manual release of one buckle, the system automatically releases the other buckle regardless of which buckle is first manually released.

The presenter mechanism 26 is shown in FIG. 7 with the side cover 102 on the seat cushion which conceals the mechanism 46 removed. The presenter mechanism includes a plate 104 secured to the frame of the seat cushion. A structure 106 extends laterally from the plate 104 along the outboard side of the seat assembly to provide increased side impact protection.

The anchor 208 travels fore and aft along an elongated guide track 108 mounted to the plate 104. A cable 110 extends through the track 108 and is routed over pulleys 112 at the ends of the track with the cable ends wound upon a spool 114 disposed below the track 108. A motor assembly 116 powers a transmission 118 coupled to a drive shaft 120 upon which the drum 114 is mounted to rotate the drum. Depending upon the direction of rotation of drum 114, the cable 110 will move the seat belt anchor either forward or rearward along the guide track. Limit switches (not shown) are attached to the track 108 to deactivate the motor 116 when the anchor has reached its forward position or returned to the normal rearward lock position. Once returned to the lock position, a hook 122 engages the lower end of the anchor while a bar 124 overlies a rear portion of the anchor 28 to carry loads applied to the seat belt anchor during a vehicle collision. The drum and cable drive system as well as the guide track 108 are intended to provide only fore and aft travel of the anchor and are not intended to provide the necessary support to the anchor to withstand seat belt loading. The locking mechanism is similar to that used with passive seat belt systems to lock the seat belt in place.

An alternative embodiment of the presenter mechanism is shown in FIG. 8 and designated generally at 126. Mechanism 126 includes a track 128 carried by the plate 104 for guiding the motion of the anchor 28 fore and aft. A flexible tape drive 130 is used which includes a tape 132 captured in a closed channel 134 and coupled to the anchor 28 to move the anchor fore and aft. A motor 136 is used to push or pull on the tape 132. The excess tape is stored in a spiral maze contained in housing 138 adjacent to the motor 136. The motor 136 and maze 138 can be conveniently mounted to the seat below cushion 14. The hook 122 and bar 124 are used to lock the anchor 28 in place when it is returned to the rearward lock position. The presenter mechanisms 46 and 126 are not unlike the mechanisms used in passive seat belt systems to move the seat belts.

The seat belt system of the present invention provides a presenter mechanism to move the seat belt clasped into an easy to reach position making it more convenient for a seat occupant and providing an incentive for use of the seat belt system. An additional second shoulder strap is provided forming a four point system having two shoulder belts crossing the upper torso of the seat occupant. The four point system, comprising two seat belt buckles on opposite sides of the seat assembly, includes release mechanism to automatically release one buckle upon the manual release of the other buckle as a further convenience to encourage seat belt usage.

It is to be understood that the invention is not limited to the exact construction illustrated and described above, but that various changes and modifications may be made without departing from the spirit and scope of the invention as defined in the following claims.

What is claimed is:

1. A seat belt system for a vehicle seat having a seat cushion and a seat back, said belt system comprising:
    a seat belt retractor adjacent a first side of said seat;
    a belt webbing partially wound in said retractor with a portion of said webbing extending downwardly adjacent said seat back along said first seat side to the lower end of said seat back;
    anchor means attached to an end of said webbing at the lower end of said seat back;
    a clasp slidable along said extending portion of said webbing;
    a seat belt buckle for reception of said clasp therein disposed along a second side of said seat opposite said first side whereby upon insertion of said clasp in said buckle said webbing forms a lap belt and a shoulder belt; and
    means responsive to occupancy of said seat for moving said anchor means forward along said first seat side whereby said webbing and clasp are moved forward along said first seat side.

2. The seat belt system of claim 1 wherein said moving means is operable to return said anchor means rearward along said seat first side to a lock position upon the passage of a predetermined time period or upon the insertion of said clasp in said buckle, which ever occurs first.

3. The seat belt system of claim 1 wherein said belt system is carried by the vehicle seat.

4. The seat belt system of claim 1 wherein said retractor and said anchor means are mounted to said vehicle seat along said first side of said seat and said buckle is mounted to said second side of said seat.

5. The seat belt system of claim 4 wherein the first side of said seat is the outboard side of the seat and the second side is the inboard side of the seat in relation to the vehicle.

6. The seat belt system of claim 3 wherein said moving means comprises:
    an elongated guide track mounted to said first side of said seat cushion along which said anchor means is movable;
    a drum and cable drive mechanism having a drum spaced from said guide track and a cable, the ends of which are wrapped around said drum in opposite circumferential directions and a middle portion extending through said guide track;
    motor drive means for rotating said drum;
    said anchor means being attached to said cable whereby upon rotation of said drum said cable moves through said guide track to move said anchor means along said first seat side.

7. The seat belt system of claim said moving means comprises:
    an elongated guide track mounted to said first side of said seat cushion along which said anchor means is movable;
    a tape drive mechanism including a flexible tape movable within a closed channel and coupled to said anchor means and motor means engaging said tape for moving said tape within said closed channel.

8. The seat belt system of claim 1 further comprising:
    a second retractor adjacent said second seat side;
    a second belt webbing partially wrapped around said retractor with said second webbing extending downwardly adjacent said seat belt along said second seat side and ending with a second clasp;
    a second buckle adjacent said first seat side at the rear of said cushion for reception of said second clasp therein; and
    means for automatically release one of said buckles in response to manually releasing the other of said buckles.

9. A seat belt system comprising:

first and second belt clasps;

first and second belt buckles for locking reception of said first and second clasps respectively, said buckles each including manually operated means to release said clasps from said buckles; and means for automatic release of one of said clasps from the respective buckle in response to the manual release of the other clasp from the opposite buckle.

10. The seat belt system of claim 9 further comprising means for preventing locking reception of said second clasp in said second buckle unless said first clasp is locking when received in said first buckle.

11. The seat belt system of claim 9 wherein said automatic release means comprises switch means to detect the presence of said clasps in said latches;

linear actuator means coupled to said buckles to release said clasps; and circuit means for selectively connecting said linear actuator means to a power source through said switch means to actuate said linear actuator means to release said clasps from said buckles.

12. The seat belt system of claim 11 wherein said circuit means and seat switch means comprises:

first and second leads connected in parallel to a power source;

single pole double throw switch means to selectively couple said linear actuator means to said power source through either of said first or second leads, said single pole double throw switch means operable to connect said first lead to said linear actuator means when said first clasp is not received in said first buckle and operable to connect said second lead to said linear actuator means when said first clasp is locked in said first buckle;

normally open presence switch means in said first lead operable to close upon presence of said second clasp in said second buckle; and normally open release switch means in said second lead operable to close upon manual release of said second clasp from said second buckle.

* * * * *

UNITED STATES PATENT AND TRADEMARK OFFICE
CERTIFICATE OF CORRECTION

PATENT NO. : 5,123,673

DATED : June 23, 1992

INVENTOR(S) : Omar D. Tame

It is certified that error appears in the above-identified patent and that said Letters Patent is hereby corrected as shown below:

On the title page, in item [75]:

Under Inventors along with "Omar D. Tame" please include -- Duane E. Potes, Jr., Adrian, Benny T. Vo, Chelsea, and Thomas F. Kracht, Canton, all of Mich.--

In Column 6, line 47, Claim 7 after "Claim" please insert --3 wherein--.

Signed and Sealed this

Twentieth Day of October, 1992

*Attest:*

DOUGLAS B. COMER

*Attesting Officer*   *Acting Commissioner of Patents and Trademarks*